(12) United States Patent
Chang et al.

(10) Patent No.: US 10,951,636 B2
(45) Date of Patent: Mar. 16, 2021

(54) DYNAMIC PHISHING DETECTION METHODS AND APPARATUS

(71) Applicant: Trend Micro Incorporated, Tokyo (JP)

(72) Inventors: Ming-Tai Allen Chang, Taipei (TW);
Yu-Fang Eddie Tsai, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 30 days.

(21) Appl. No.: 16/545,995

(22) Filed: Aug. 20, 2019

(65) Prior Publication Data
US 2020/0045067 A1    Feb. 6, 2020

Related U.S. Application Data

(63) Continuation of application No. 11/617,569, filed on Dec. 28, 2006, now abandoned.

(51) Int. Cl.
*H04L 29/06* (2006.01)
*G06F 21/51* (2013.01)
*G06F 21/55* (2013.01)

(52) U.S. Cl.
CPC .......... *H04L 63/1416* (2013.01); *G06F 21/51* (2013.01); *G06F 21/55* (2013.01); *H04L 63/1483* (2013.01); *G06F 2221/2119* (2013.01)

(58) Field of Classification Search
CPC . H04L 63/1483; H04L 63/1416; G06F 21/51; G06F 21/55

USPC .......................................................... 726/22
See application file for complete search history.

(56) References Cited

U.S. PATENT DOCUMENTS

| | | | |
|---|---|---|---|
| 7,630,987 B1 * | 12/2009 | Renfro | ................ H04L 63/1483 |
| 2006/0101514 A1 * | 5/2006 | Milener | .............. H04L 67/2847 726/22 |

* cited by examiner

*Primary Examiner* — Jacob Lipman
(74) *Attorney, Agent, or Firm* — Okamoto & Benedicto LLP

(57) ABSTRACT

A computer-implemented method for detecting a phishing attempt by a given website is provided. The method includes receiving a webpage from the given website, which includes computer-readable code for the webpage. The method also includes ascertaining hyperlink references in the computer-readable code. Each hyperlink reference refers to at least a component of another webpage. The method further includes performing linking relationship analysis on at least a subset of websites identified to be referenced by the hyperlink references, which includes determining whether a first website is in a bi-directional/uni-directional linking relationship with the given website. The first website is one of the subset of websites. The method yet also includes, if the first website is in the bi-directional linking relationship, designating the given website a non-phishing website. The method yet further includes, if the first website is in the uni-directional linking relationship, performing anti-phishing measures with respect to the given website.

5 Claims, 6 Drawing Sheets

US 10,951,636 B2

DYNAMIC PHISHING DETECTION METHODS AND APPARATUS

CROSS-REFERENCE TO RELATED APPLICATION(S)

The present application is a continuation of U.S. patent application Ser. No. 11/617,569, filed Dec. 28, 2006, entitled "Dynamic Phishing Detection Methods and Apparatus," the disclosure of which is hereby incorporated by reference.

BACKGROUND OF THE INVENTION

Phishing represents a fraudulent technique employed to obtain confidential transaction information (such as user name, password, financial information, credit card information, etc.) from computer users for misuse. In phishing, the phisher employs a phishing server to send an apparently official electronic communication (such as an official looking email) to the victim. For example, if a phisher wishes to obtain confidential information to access a victim's account at XYZ bank, the email would typically come from an XYZ bank email address and contain official-looking logos and language to deceive the victim into believing that the email is legitimate.

Further, the phisher's email typically includes language urging the victim to access the website of XYZ bank in order to verify some information or to confirm some transaction. The email also typically includes a link for use by the victim to supposedly access the website of XYZ bank. However, when the victim clicks on the link included in the email, the victim is taken instead to a sham website set up in advance by the phisher. The sham website, referred to herein as the phishing website, would then ask for confidential information from the victim. Since the victim had been told in advance that the purpose of clicking on the link is to verify some account information or to confirm some transaction, many victims unquestioningly enter the requested information. Once the confidential information is collected by the phisher, the phisher can subsequently employ the information to perpetrate fraud on the victim by stealing money from the victim's account, by purchasing goods using the account funds, etc.

FIG. 1 illustrates an example of a phishing attack. In FIG. 1, a phisher 102 (typically an email server that is under control of a human phisher) sends an official-looking email 104 designed to convince a recipient 108 that the email is sent by a legitimate business, such as by bank 106. The email may, for example, attempt to convince the recipient 108 to update his account by clicking on an attached link to access a webpage. If the recipient 108 clicks on the link, the webpage that opens would then request the user to enter the user's confidential information such as userid, password, account number, etc.

However, since the webpage did not come from the legitimate business 106, the user's confidential information is sent (110) the user's confidential information to a phishing website 112. Phishing website 112 then collects the user's confidential information to allow the phisher to perpetrate fraud on the user.

Because phishers actually divert the victim to another website other than the website of the legitimate business that the victim intended to visit, some knowledgeable users may be able to spot the difference in the website domain names and may become alert to the possibility that a phishing attack is being attempted. For example, if a victim is taken to a website whose domain name "http://218.246.224.203/icons/cgi-bin/xyzbank/login.php" appears in the browser's URL address bar, that victim may be alert to the fact that the phisher's website URL address as shown on the browser's URL toolbar is different from the usual "http://www.xyzbank.com/us/cgi-bin/login.php" and may refuse to furnish the confidential information out of suspicion. However, it is known that many users are not sophisticated or always vigilant against phishing attempts. Accordingly, relying on users to stay on guard against phishing attempts has proven to be an inadequate response to the phishing problem.

Phishing can also be detected via phishing detection software and/or hardware. For example, URL filtering may be employed by the prior art phishing detection software to detect whether a particular website is a known phishing website. As an example, if the website with IP address 218.246.224.203 is known to be a phishing website, an attempt to access that website by the user (such as done when the user responds to an email sent from the phisher's server by clicking on a link in the email) will be detected by the phishing detection software, and the attempted access to the phishing webpage will be denied.

However, URL filtering requires the prior knowledge pertaining to whether a particular website is a phishing website. If a phisher sets up a new website for the purpose of committing phishing fraud, and the new website has a new IP address that has not yet been detected as a phishing website, URL filtering by the prior art phishing detection software would not be able to detect this newly set up website as a phishing website.

SUMMARY OF INVENTION

The invention relates, in an embodiment, to a computer-implemented method for detecting a phishing attempt by a given website. The computer-implemented method includes receiving a webpage from the given website, which includes computer-readable code for the webpage. The computer-implemented method also includes ascertaining a set of hyperlink references in the computer-readable code. Each hyperlink reference in the set of hyperlink references refers to at least a component of another webpage that is associated with the given website or a website different from the given website. The computer-implemented method further includes performing linking relationship analysis on at least a subset of websites identified to be referenced by the set of hyperlink references, which includes determining whether a first website that is associated with a webpage referenced by a first one of the set of hyperlink references is in a bi-directional linking relationship with the given website or in a uni-directional linking relationship with the given website. The first website is one of the subset of websites. The computer-implemented method yet also includes, if the first website is in the bi-directional linking relationship with the given website, designating the given website a non-phishing website. The computer-implemented method yet further includes, if the first website is in the uni-directional linking relationship with the given website, performing anti-phishing measures with respect to the given website.

In another embodiment, the invention relates to a computer-implemented method for detecting a phishing attempt by a given website. The computer-implemented method includes receiving a webpage from the given website, which includes computer-readable code for the webpage. The computer-implemented method also includes obtaining from the computer readable code a transaction destination URL, which includes representing a destination URL for transaction information requested by the webpage. The computer-implemented method further includes ascertaining a set of hyperlink references in the computer-readable code. Each hyperlink reference in the set of hyperlink references refers to at least a component of another webpage that is associated with given website or a website different from the given website. The computer-implemented method yet also includes performing transaction destination analysis on at least a subset of websites identified to be referenced by the set of hyperlink references, which includes ascertaining a first transaction destination URL specified by a transaction page in a first website that is associated with a webpage referenced by a first one of the set of hyperlink references. The first transaction destination URL represents a destination URL for transaction information requested by the transaction page in the first website. The computer-implemented method yet further includes, if the transaction destination URL obtained from the computer readable code for the webpage from the given website is different from the first transaction destination URL, performing anti-phishing measures with respect to the given website.

In yet another embodiment the invention relates to an article of manufacture having thereon computer storage medium and computer readable code configured for a phishing attempt by a given website. The article of manufacture includes computer readable code for receiving a webpage from the given website, which includes computer-readable code for the webpage. The article of manufacture also includes computer readable code for obtaining from the computer readable code a transaction destination URL, which includes representing a destination URL for transaction information requested by the webpage. The article of manufacture further includes computer readable code for ascertaining a set of hyperlink references in the computer-readable code. Each hyperlink reference in the set of hyperlink references refers to at least a component of another webpage that is associated with given website or a website different from the given website. The article of manufacture yet also includes performing transaction destination analysis on at least a subset of websites identified to be referenced by the set of hyperlink references, which includes ascertaining a first transaction destination URL specified by a transaction page in a first website that is associated with a webpage referenced by a first one of the set of hyperlink references. The first transaction destination URL represents a destination URL for transaction information requested by the transaction page in the first website. The article of manufacture yet further includes, if the transaction destination URL obtained from the computer readable code for the webpage from the given website is different from the first transaction destination URL, performing anti-phishing measures with respect to the given website.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
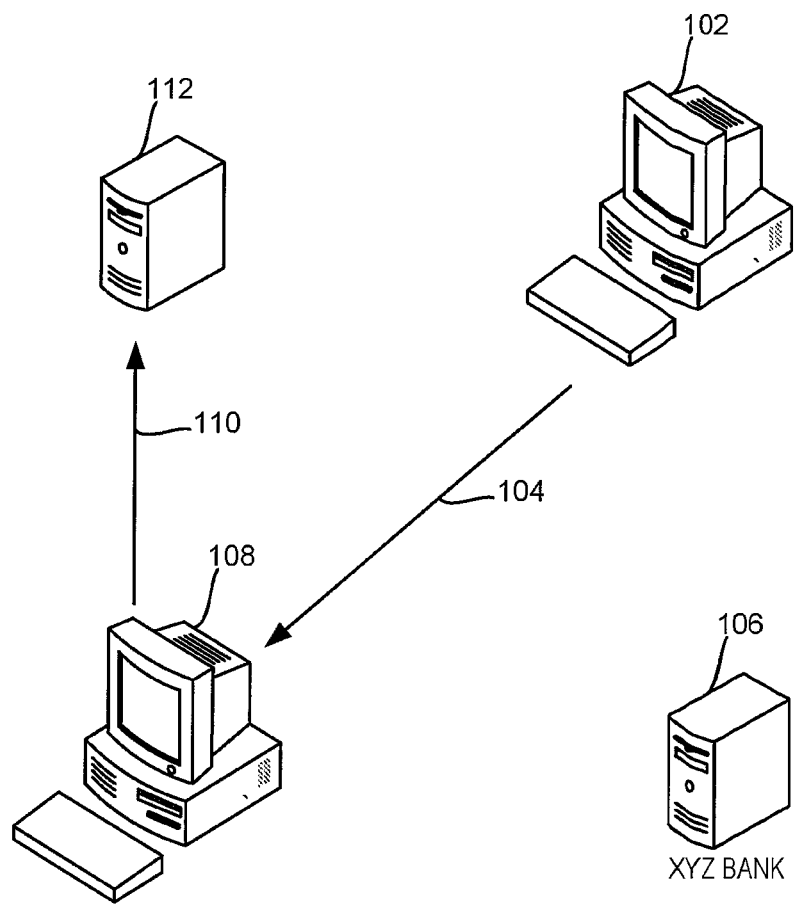
FIG. 1 illustrates an example of a phishing attack.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided methods and apparatus for dynamically detecting an attempted phishing fraud. As the user (e.g., the recipient of the email suggesting that the recipient needs to click on a link to confirm some transaction information) attempts to access the webpage that is configured to extract the transaction information (such as authentication information or financial/credit information), the suspect webpage is first intercepted and analyzed. In the context of the present invention, a suspect webpage is a webpage that is suspected of being a phishing webpage and needs further analysis to resolve whether that webpage is indeed a phishing webpage.

In an embodiment, the computer readable code (e.g., HTML or XML) that implements/renders the suspect webpage is examined. From this examination, embodiments of the invention ascertain whether the suspect webpage originates from a phishing website and should be disallowed. In an embodiment, the determination is made without requiring prior knowledge regarding whether the web server or the website that transmits the suspect webpage has been implicated in phishing in the past.

In an embodiment, the computer readable code for the webpage under examination ("UE webpage") is analyzed for the presence of hyperlinks. A hyperlink is a construct that allows component(s) of a webpage (the "link from" webpage) to be derived or obtained from component(s) of another webpage (the "link to" webpage). For example, a webpage "A" to be rendered may be implemented by computer readable code that includes a hyperlink to another webpage "B" so that certain components of webpage "B" can be rendered or executed in webpage "A."

In an embodiment, all websites associated with webpages linked to by the hyperlinks are analyzed for their linking relationships with the suspect webpage. In another embodiment, the hyperlinks are first ranked to determine the identity of the most relevant website(s). For example, it may be known that certain websites (e.g., the biggest banks) or certain types of websites (e.g., banks, auction sites, electronic payment sites) tend to be targeted by phishers, and these hyperlinked sites would have a higher score (for the purpose of determining whether they are relevant) than other hyperlinked sites. Alternatively or additionally, certain types of hyperlinks may be associated with a higher score (for the purpose of determining whether the hyperlinked sites are relevant) than others. For example, anchor hyperlinks or hyperlinks to certain types of web resources may be associated with higher scores than hyperlinks to static images. The hypothesis is that if the UE webpage is indeed a phishing webpage, the attacked website (i.e., the website that the phisher is attempting to imitate to deceive the user into providing confidential transaction information) would be one of the more relevant website(s) ascertained from the hyperlinks.

After the relevant website(s) are ascertained, a linking relationship analysis is made to ascertain whether the link between the UE webpage and the attacked website is a uni-directional link or a bi-directional link. A uni-directional link in this case refers to the link from the UE webpage to a webpage in the attacked website without a link back from the attacked website to the UE webpage. On the other hand, the link is said to be bi-directional if there exist one or more links from the UE webpage to the attacked website and there also exist one or more links from the attacked website to the UE webpage.

If the link is only uni-directional, the UE webpage is deemed to be a phishing webpage and anti-phishing measures may be undertaken. The anti-phishing measures may include, for example, flagging the webpage and/or website for blacklisting and/or for further analysis/investigation. Alternatively or additionally, the anti-phishing measures may include, for example, blocking the webpage and/or website from reaching the user. Alternatively or additionally, the anti-phishing measures may include, for example, preventing any transactional information entered by the user from reaching the phishing website. Other anti-phishing measures may also be taken.

On the other hand, if the link is bi-directional, the UE webpage is deemed not to be a phishing webpage.

In one or more embodiments of the invention, HTTP transaction analysis may be performed to ascertain whether phishing is being attempted. In an embodiment, an intercepted UE webpage may be analyzed to ascertain whether the HTTP transaction destination matches that of the website being attacked. In an embodiment, if the UE webpage is a transaction webpage (i.e., one that asks for login information such as userid, password, or asks for financial information such as social security number, bank account number, etc.) the HTTP transaction destination for that UE webpage is first ascertained. For example, the HTTP transaction destination may request that the userid entered by the user be transmitted to a given URL. Furthermore, the HTML hyperlinks in that webpage are analyzed to ascertain the webpage (s) that are hyperlinked to.

In an embodiment, the hyperlinked webpages are then analyzed to ascertain whether the hyperlinked websites (i.e., the websites associated with the hyperlinked webpages) also have similar transaction webpages. Similarity between webpages may be ascertained in many ways, including for example comparing text or images in the webpages. If a similar transaction webpage exists, its HTTP transaction destination is ascertained. For example, the HTTP transaction destination for a transaction page of the legitimate website (e.g., XYZ bank) may specify that the user-input userid and password be transmitted to a given URL. If the HTTP transaction destination associated with the transaction page of the hyperlinked website and the HTTP transaction destination associated with suspect transaction webpage are different, phishing is a possibility and anti-phishing measures may be undertaken.

Figure 2:
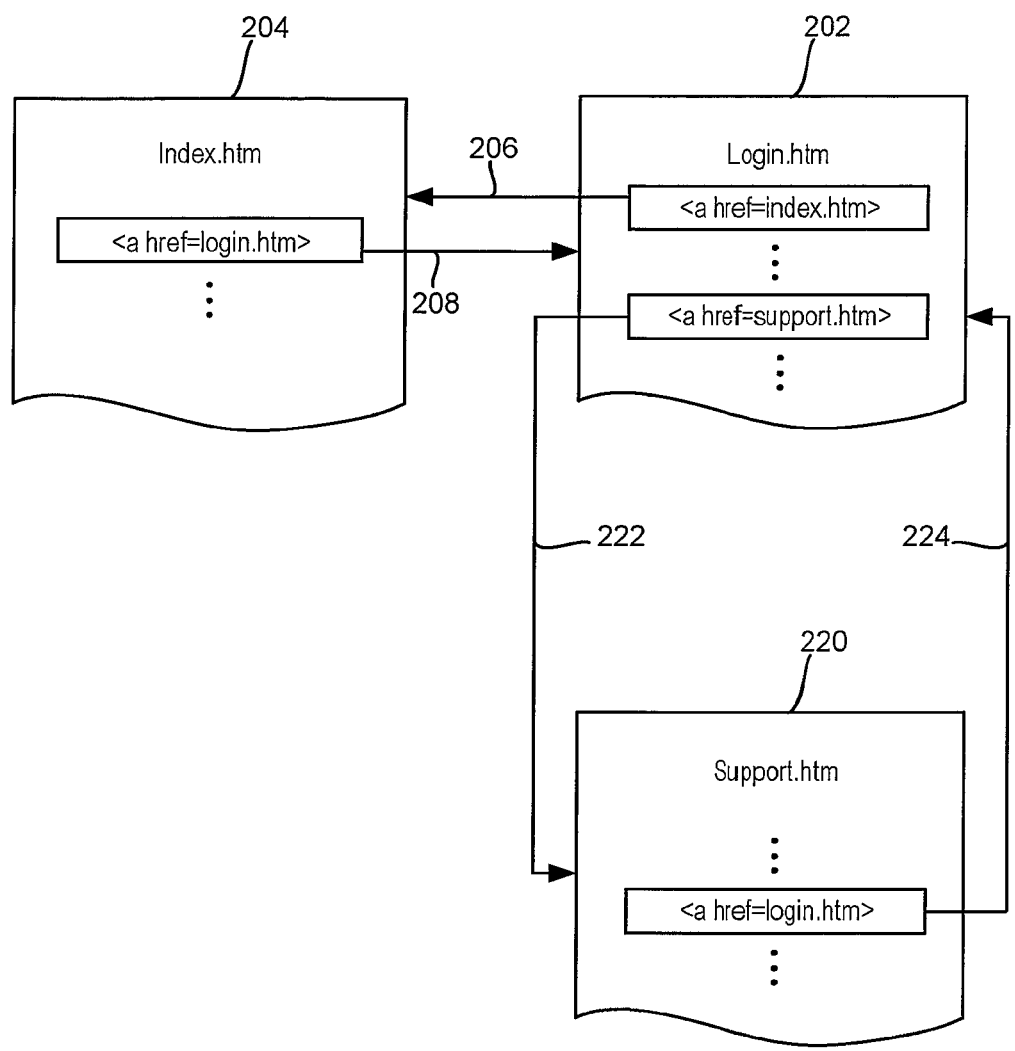
FIG. 2 shows, in accordance with an embodiment of the present invention, an example HTTP hyperlink analysis showing bi-directional hyperlinking between two webpages.

The features and advantages of the invention may be better understood with reference to the figures and discussion that follow. FIG. 2 shows, in accordance with an embodiment of the present invention, an example HTTP hyperlink analysis showing bi-directional hyperlinking between a webpage 202 and a webpage 204. In this case, webpage 202 hyperlinks to webpage 204 (link away from webpage 202 to webpage 204 via arrow 206) and is in turn hyperlinked by webpage 204 (link back from webpage 204 to webpage 202 via arrow 208). Likewise, there is bi-directional hyperlinking between a webpage 202 and a webpage 220. In this case, webpage 202 hyperlinks to webpage 220 (via arrow 222) and is in turn hyperlinked by webpage 206 (via arrow 224). Note that when hyperlinking is employed, it is not necessary that webpages 202, 204, and 220 be implemented in the same website or in the same server.

Figure 3:
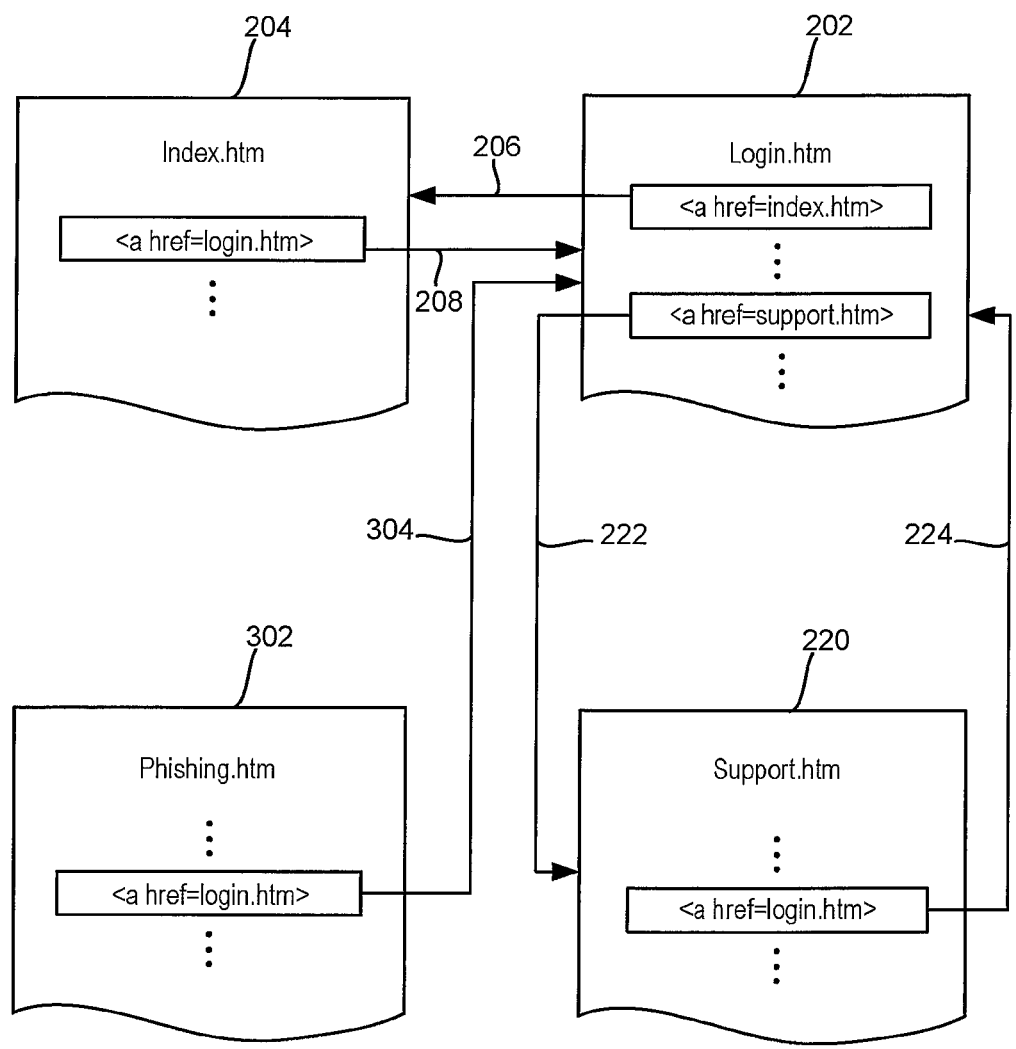
FIG. 3 shows, in accordance with an embodiment of the present invention, another example HTTP hyperlink analysis showing uni-directional hyperlinking between two webpages.

FIG. 3 shows, in accordance with an embodiment of the present invention, another example HTTP hyperlink analysis showing uni-directional hyperlinking between a webpage 302 and a webpage 202. In this case, webpage 302 hyperlinks to webpage 202 (via arrow 304). However, there are no hyperlinks that link from webpage 202 to webpage 302. In this case, the HTTP hyperlink analysis suggests that webpage 302 may represent a webpage that is attempting to perform a phishing attack on the website associated with webpage 202 by deceiving a user to enter confidential information normally entered into webpage 202.

Figure 4:
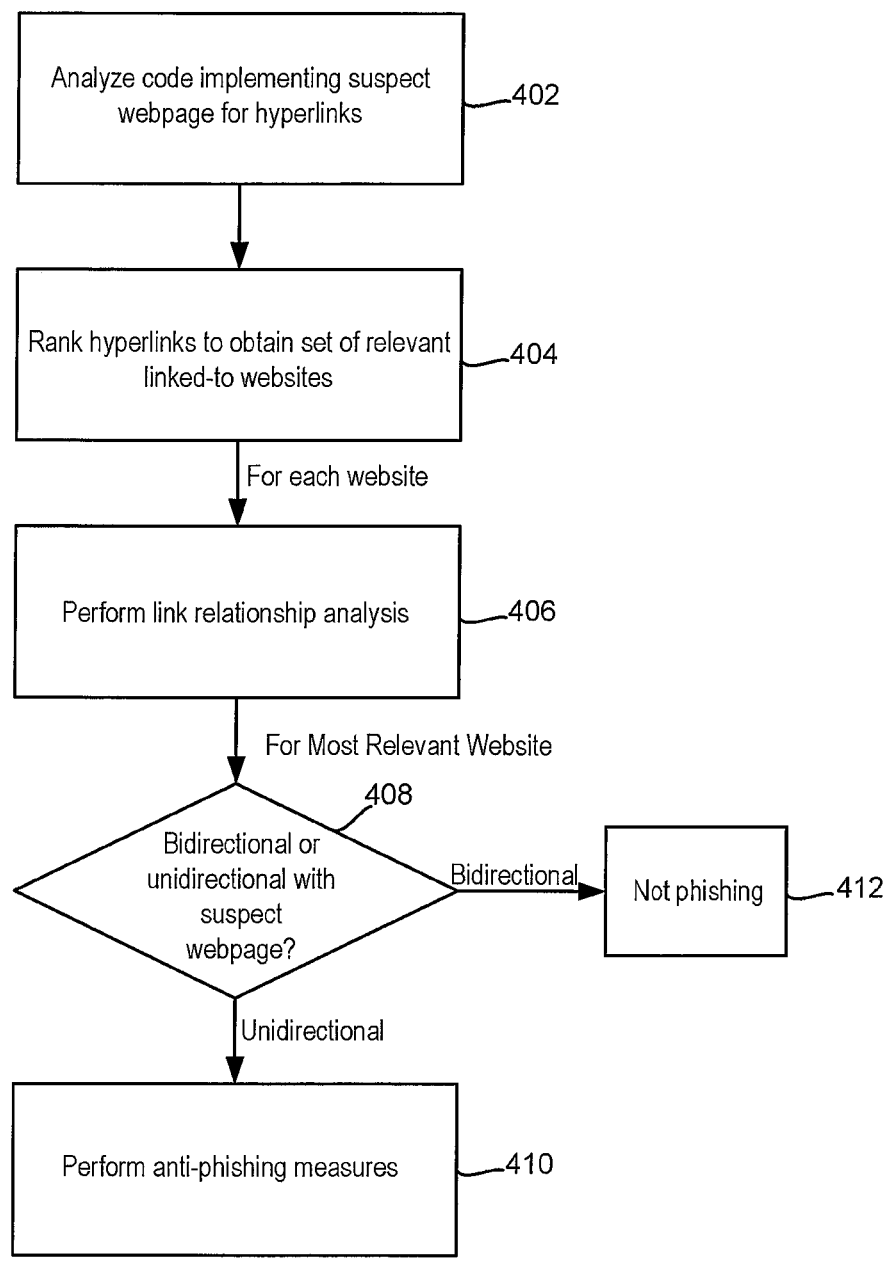
FIG. 4 shows, in accordance with an embodiment of the present invention, the steps for analyzing a suspect webpage.

FIG. 4 shows, in accordance with an embodiment of the present invention, the steps for analyzing a suspect webpage. In step 402, the computer readable code such as the HTML code that implements the webpage is analyzed for hyperlink references and for credential information transaction constructs, e.g., one that requests the user to enter login information such as userid, password, or identification information such as name, birth date, social security number, driver license number or financial-related information such as bank account number, credit card number, etc. In step 404, the hyperlinks ascertained in step 402 are ranked to determine which linked-to webpages (and thus websites) are most relevant.

If the suspect webpage is not a transaction webpage, no further analysis is necessary since the purpose of phishing is to acquire the transaction information, and the suspect webpage is now no longer a suspect since that suspect webpage does not ask for transaction information.

In an embodiment, such ranking may be deemed optional and may be omitted if desired. As mentioned, certain hyperlinks may be deemed more relevant than others based on types, the identity of the linked-to webpages and/or linked-to websites, etc. From step 404, a set of websites deemed relevant is ascertained.

In step 406, link relationship analysis is performed for the most relevant website that is either ranked in step 404 or, depending on the specific embodiments, ascertained in via hyperlinks in step 402. In linking relationship analysis, the linked-to website is analyzed to determine whether the hyperlink references between the suspect webpage and the linked-to website are bi-directional or unidirectional. If the hyperlink reference is only unidirectional (i.e., only from the suspect webpage to the linked-to website) (step 408), anti-phishing measures may be undertaken (410), including for example flagging the suspect webpage for further analysis and/or prohibiting user access to the suspect website. On the other hand, if the hyperlink references are bi-directional (i.e., from the suspect webpage to the linked-to website and from the linked-to website back to the suspect webpage, it is deemed that phishing is unlikely (412).

Figure 5:
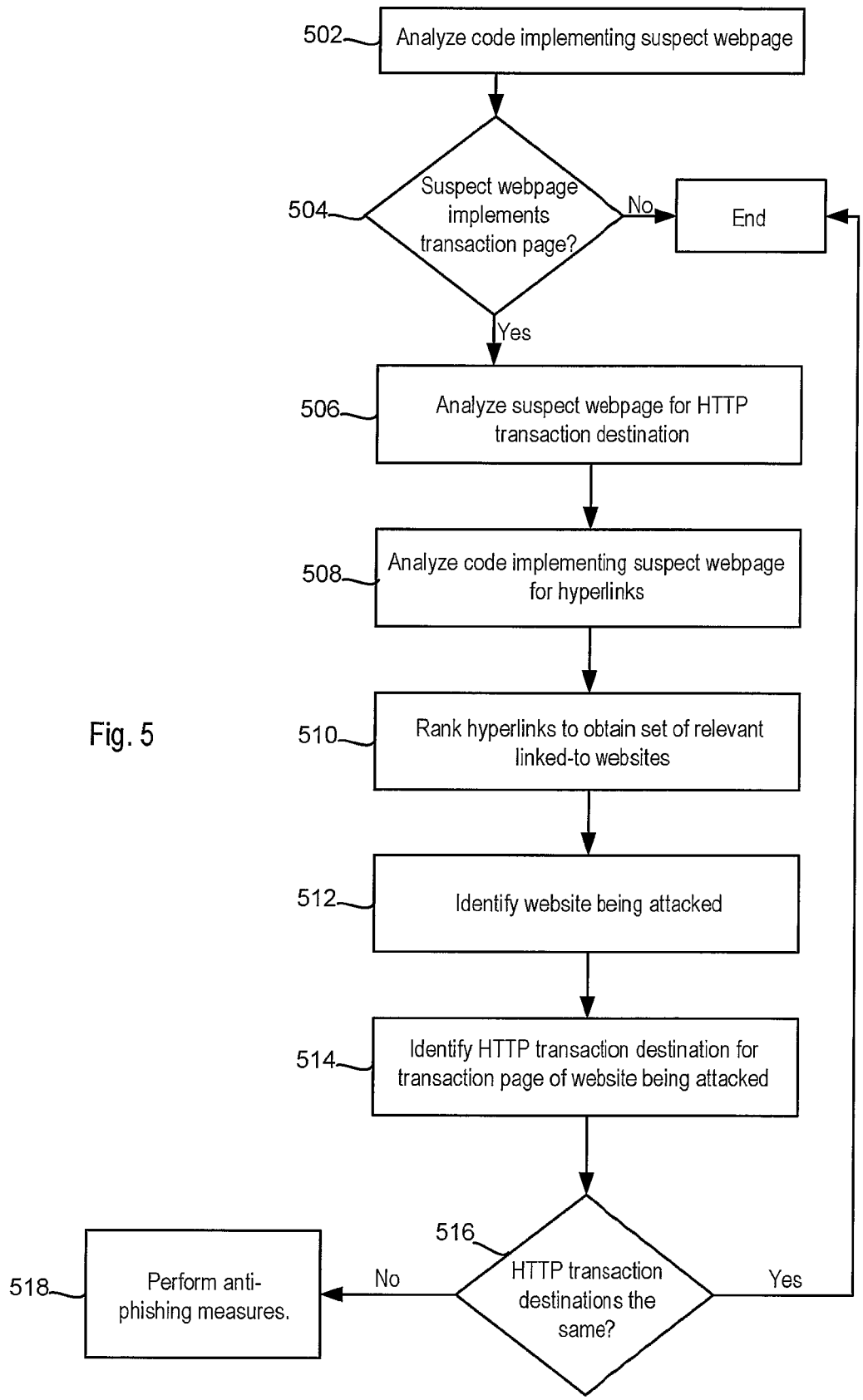
FIG. 5 shows, in accordance with an embodiment of the invention, the steps for performing HTTP transaction analysis on a suspect webpage.

Alternatively or additionally, HTTP transaction analysis may be performed. In HTTP transaction analysis, the suspect webpage may be analyzed to ascertain whether the HTTP transaction destination specified by the suspect transaction webpage is the same or different from that specified the transaction webpage of the website being attacked. FIG. 5 shows, in accordance with an embodiment of the invention, the steps for performing HTTP transaction analysis on a suspect webpage. In step 502, the computer readable code of the suspect webpage is analyzed to ascertain whether the suspect webpage is implementing a transaction page, e.g., one that requests the user to enter login information such as userid, password, or identification information such as name, birth date, social security number, driver license number or financial-related information such as bank account number, credit card number, etc.

If the suspect webpage is not a transaction webpage (as determined by step 504), no further analysis is necessary since the purpose of phishing is to acquire the transaction information, and the suspect webpage is now no longer a suspect since that suspect webpage does not ask for transaction information.

On the other hand, if the suspect webpage is a transaction page, its computer readable code (e.g., HTML) is then analyzed (step 506) to ascertain the HTTP destination link(s) for the user-input transaction data. This HTTP destination link represents the URL to which the requested transaction information would have been sent if the user had entered the information as requested by the suspect webpage.

In step 508, the computer readable code, such as the HTML code that implements the webpage, is analyzed for hyperlink references. In step 510, the hyperlinks ascertained in step 508 are ranked to determine which linked-to webpages and websites are most relevant. In an embodiment, such ranking may be deemed optional and may be omitted if desired. As mentioned, certain hyperlinks may be deemed more relevant than others based on types, the identity of the linked-to webpages and/or linked-to websites, etc. From step 510, a set of websites deemed relevant is ascertained.

In step 512, the websites ascertained in step 510 are tested to ascertain which of these websites the suspect webpage may have tried to attack (i.e., to fraudulently emulate). For example, the text and/or images associated with webpages in these websites may be compared against the text and/or images of the suspect webpage to determine the identity of the webpage being fraudulently imitated (which in turn reveals the identity of the website being attacked, e.g., XYZ bank).

In step 514, the transaction page (e.g., the login page) of the website being attacked (e.g., the XYZ bank website) is analyzed for its transaction destination hyperlink(s). These transaction destination links (which represent the destinations for the transaction information if the user had entered such transaction information into the transaction page of the website being attacked) are then compared (step 516) against the transaction destination hyperlinks obtained from the suspect webpage.

If the two sets of transaction destination hyperlinks are the same (step 516), the phishing risk is negligible since the user's transaction information would have been sent to the transaction destination specified by the transaction page of the legitimate website anyway.

On the other hand, if the two sets of transaction hyperlinks are different, phishing is a possibility since the transaction information entered by the user using the suspect webpage is transmitted to a HTTP transaction destination that is different from the HTTP transaction destination specified by the transaction page of the legitimate website. In this case, anti-phishing measures may be undertaken.

Figure 6:
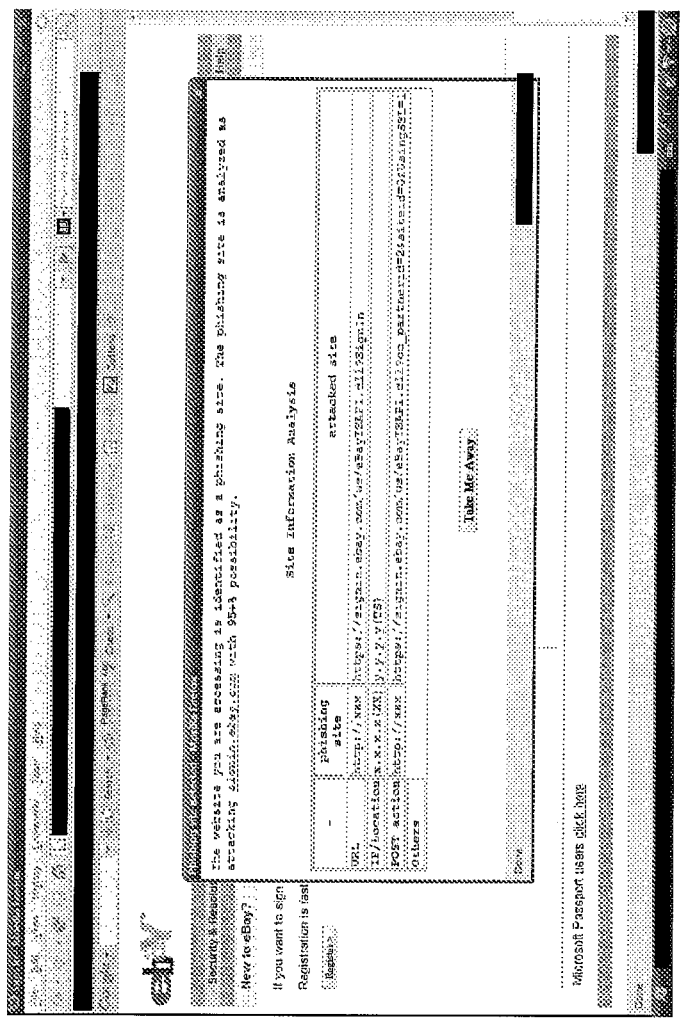
FIG. 6 shows, in accordance with an embodiment of the invention, an example of a pop-up window, which is presented to the user after a phishing attempt is detected.

In one or more embodiment, a pop-up webpage may be provided to the user if a website is found to be a phishing website. In this case, since the identity of the target website can be ascertained, the popup page can include information about the phishing site, such as its IP address, its location, its URL, etc. Furthermore, an option "Take me away" may be provided to the user to allow the user to be taken to the legitimate site that is being attacked (e.g., the login page of a bank, for example), thereby conveniently allowing the user to continue his access with the legitimate website. FIG. 6 is an example of such a pop-up window, which is presented to the user after a phishing attempt is detected.

As can be appreciated from the foregoing, embodiments of the invention render it possible to dynamically ascertain whether a particular webpage that the user is attempting to access is likely to be associated with a phishing website. In other word, embodiments of the invention render it possible to detect a phishing attempt even if the phishing website has never been ascertained and/or designated previously as a phishing website. In various embodiments, the detection may be performed when the fraudulent email is transmitted to the user's email system, or in response to the user clicking on the embedded link to attempt to access the suspect webpage, or when the suspect webpage is received, or even when the user attempts to enter transaction data into a suspect webpage. For higher performance, one or both of the link relationship analysis and the HTTP transaction analysis may be performed on the suspect website, if desired.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for detecting a phishing attempt by a given website, comprising:
    receiving a webpage from said given website, including computer-readable code for said webpage;
    ascertaining a set of hyperlink references in said computer-readable code, each hyperlink reference in said set of hyperlink references referencing at least a component of another webpage that is associated with said given website or a website different from said given website;
    performing linking relationship analysis on at least a subset of websites identified to be referenced by said set of hyperlink references, including determining whether a first website that is associated with a webpage referenced by a first one of said set of hyperlink references is in a bi-directional linking relationship with said given website or in a uni-directional linking relationship with said given website, said first website being one of said subset of websites;
    if said first website is in said bi-directional linking relationship with said given website, designating said given website a non-phishing website; and
    if said first website is in said uni-directional linking relationship with said given website, performing anti-phishing measures with respect to said given website.

2. The method of claim 1 wherein said subset of websites represents or more website identified to be most relevant.

3. The method of claim 1 wherein said first one of said set of hyperlink references has a first type, said first type being a member of a predefined set of triggering hyperlink reference types.

4. The method of claim 3 wherein said subset of websites represents websites associated with hyperlink references whose types belong to said predefined set of triggering hyperlink reference types, said performing said linking relationship analysis is performed only on said subset of websites.

5. The method of claim 4 wherein said predefined set of triggering hyperlink reference types includes an anchor hyperlink reference type.

* * * * *